(12) United States Patent
Jiang et al.

(10) Patent No.: US 11,573,871 B2
(45) Date of Patent: Feb. 7, 2023

(54) DEBUGGING METHOD FOR USB DEVICE AND USB DEVICE

(71) Applicant: YEALINK (XIAMEN) NETWORK TECHNOLOGY CO., LTD., Fujian (CN)

(72) Inventors: Hu Jiang, Fujian (CN); Yun Liao, Fujian (CN); Huirong Zhang, Fujian (CN); Zhizhong Ouyang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 455 days.

(21) Appl. No.: 16/835,554

(22) Filed: Mar. 31, 2020

(65) Prior Publication Data

US 2020/0356453 A1 Nov. 12, 2020

(30) Foreign Application Priority Data

May 8, 2019 (CN) .......................... 201910381978.X (51) Int. Cl.
*G06F 11/22* (2006.01)
*G06F 13/42* (2006.01)

(52) U.S. Cl.
CPC ........ *G06F 11/221* (2013.01); *G06F 11/2221* (2013.01); *G06F 13/4282* (2013.01)

(58) Field of Classification Search
CPC ........................... G06F 11/221; G06F 13/4282
See application file for complete search history.

(56) References Cited

U.S. PATENT DOCUMENTS

| 6,085,265 A | * | 7/2000 | Kou | G06F 13/102 |
| | | | | 710/63 |
| 2007/0006035 A1 | * | 1/2007 | Usui | G06F 11/261 |
| | | | | 714/E11.16 |
| 2008/0147943 A1 | * | 6/2008 | Freimuth | G06F 13/4282 |
| | | | | 710/240 |

(Continued)

FOREIGN PATENT DOCUMENTS

| CN | 109460310 A | * | 3/2019 | .......... G06F 11/0766 |
| CN | 110716831 A | * | 1/2020 | |
| CN | 111045977 A | * | 4/2020 | ......... G06F 13/4282 |
| CN | 111769999 A | * | 10/2020 | ............ G06F 11/362 |
| CN | 112131162 A | * | 12/2020 | |

(Continued)

OTHER PUBLICATIONS

EPO Search Report for European Patent Application No. EP20167234 dated Oct. 6, 2020, 2 pages. (Year: 2020).*

(Continued)

*Primary Examiner* — Matthew M Kim
*Assistant Examiner* — Indranil Chowdhury (57) ABSTRACT

A debugging method for a Universal Serial Bus (USB) device includes: receiving input information of a terminal through a Human Interface Device (HID) device; when report ID of the input information is a serial port ID, transmitting the input information to a buffer of a virtual serial port Teletype (TTY) device; and extracting the input information of the terminal from the buffer of the virtual serial port TTY device, executing a shell command on the input information, and returning execution result to the terminal through an original path. The method uses a USB interface to implement a HID device, thereby realizing drive-free execution. In addition, use of the endpoint of the HID device can save endpoints needed for additional debugging and driving.

10 Claims, 4 Drawing Sheets

(56) References Cited

U.S. PATENT DOCUMENTS

| | | | | |
|---|---|---|---|---|
| 2012/0047295 | A1* | 2/2012 | Wong | G06F 13/102 |
| | | | | 710/50 |
| 2014/0019651 | A1* | 1/2014 | Ben-Harosh | G06F 13/385 |
| | | | | 710/63 |
| 2016/0378704 | A1* | 12/2016 | Adamson | G06F 13/364 |
| | | | | 710/104 |
| 2018/0225230 | A1* | 8/2018 | Litichever | G06F 21/56 |
| 2019/0026178 | A1* | 1/2019 | Zhang | G06F 11/36 |
| 2019/0205275 | A1* | 7/2019 | Renard | H04W 12/03 |
| 2019/0235890 | A1* | 8/2019 | Schnoor | G06F 13/4068 |
| 2020/0356665 | A1* | 11/2020 | Denney | G06N 5/003 |
| 2021/0048786 | A1* | 2/2021 | Mast | G05B 19/0426 |

FOREIGN PATENT DOCUMENTS

| | | | | |
|---|---|---|---|---|
| CN | 112631851 A | * | 4/2021 | |
| WO | WO-2012171304 A1 | * | 12/2012 | H04M 3/42391 |

OTHER PUBLICATIONS

EPO Search Opinion for European Patent Application No. EP20167234 dated Oct. 6, 2020, 4 pages. (Year: 2020).*
Chinese Search Report for Chinese Patent Application No. CN201910381978 dated Jul. 27, 2020, 2 pages (Year: 2020).*
First Office Action for Chinese Patent Application No. CN201910381978 dated Aug. 4, 2020, 9 pages. (Year: 2020).*
Allman, Stuart, "Using the HID classes eases the job of writing USB device drivers", Sep. 19, 2002, EDN, pp. 83-92 (Year: 2002).*

* cited by examiner

DEBUGGING METHOD FOR USB DEVICE AND USB DEVICE

CROSS-REFERENCE TO RELATED APPLICATIONS

The present application claims the benefit of Chinese Patent Application No. 201910381978.X, filed on May 8, 2019, the contents of which are hereby incorporated by reference.

FIELD OF THE DISCLOSURE

The present disclosure relates to the technical field of Universal Serial Bus (USB) debugging, and in particular, to a debugging method for a USB device and a USB device.

BACKGROUND OF THE DISCLOSURE

Due to the plug-and-play feature of USB itself, more and more peripheral accessories have been made into with USB interfaces, and the USB ports of hosts such as personal computers (PCs), tablets are used to energize, identify and operate the accessories.

What follows is the need for debugging USB devices. The traditional debugging methods are as follows:

1) leading out serial cables on the USB devices, and using console mechanism of the LINUX (A set of free-use and free-spread UNIX-like operating system, which is a multi-user, multi-tasking, multi-threading and multi-CPU operating system based on POSIX and UNIX. It can run major UNIX tool software, applications and network protocols) to debug the devices; and 2) using Android Debug Bridge (ADB) debugging method of ANDROID (a LINUX-based free and open-source operating system).

The disadvantages of method 1) are:

hardware external serial cable is required. During the sales phase of the devices, the serial cable will be removed, and the device cannot be debugged at this time; and hackers can obtain important information about the device by viewing the print information through an external serial port, and may even crack the password mechanism of the serial port to obtain system debugging permission.

The disadvantages of method 2) are:

it is needed to install ADB driver on the hosts such as PCs to use the ADB function normally, and the configuration is a little more cumbersome; and the ADB function requires two additional bulk endpoints in order to implement the ADB GADGET function, which requires more endpoint resources of the USB devices.

During the sales phase of the devices, it is not expected that the device will enumerate one more ADB device, which is not conducive to the use of the user, and also has security risks.

SUMMARY OF THE DISCLOSURE

The technical problem to be solved by the present disclosure is to provide a debugging method for a USB device, wherein, a USB interface is used to implement a Human Interface Device (HID) device, so as to realize execution without using a device driver. In addition, use of the endpoint of the HID device saves endpoints needed for additional debugging and driving.

To solve the above problems, an embodiment of the present disclosure provides a debugging method for a USB device, including:

receiving input information of the terminal through a HID device;

when a report ID of the input information is a serial port ID, transmitting the input information to a buffer of a virtual serial port Teletype (TTY) device;

extracting the input information of the terminal from the buffer of the virtual serial port TTY device, executing a shell command on the input information, and returning an execution result to the terminal through an original path.

Furthermore, the extracting the input information of the terminal from the buffer of the virtual serial port TTY device specifically includes extracting, by a GETTTY program, the input information of the terminal from the buffer of the virtual serial port TTY device by means of/dev/ttyHID0 of the virtual serial port TTY device.

Furthermore, the method also includes:

implementing the HID device on the USB device to be debugged, wherein the HID device contains two descriptors with different report IDs; and correspondingly, implementing a serial port debugging tool for the HID device on the terminal for performing debugging communication with the USB device to be debugged, wherein the report ID in a debugging communication process is the serial port ID.

Furthermore, the method also includes:

when the report ID of the input information is a service ID, performing normal service.

An embodiment of the disclosure further provides a debugging method for a USB device, including:

sending input information to a USB device to be debugged, so that the USB device to be debugged performs the following steps:

receiving input information of a terminal through a HID device;

when a report ID of the input information is a serial port ID, transmitting the input information to a buffer of a virtual serial port TTY device; and extracting the input information of the terminal from the buffer of the virtual serial port TTY device, executing a shell command on the input information, and returning an execution result to the terminal through an original path.

Furthermore, the extracting the input information of the terminal from the buffer of the virtual serial port TTY device specifically includes extracting, by a GETTTY program, the input information of the terminal from the buffer of the virtual serial port TTY device by means of/dev/ttyHID0 of the virtual serial port TTY device.

Furthermore, the method also includes:

implementing the HID device on the USB device to be debugged, wherein the HID device contains two descriptors with different report IDs[[.]]; and correspondingly, implementing a serial port debugging tool for the HID device on the terminal for performing debugging communication with the USB device to be debugged, wherein the report ID in a debugging communication process is the serial port ID.

An embodiment of the present disclosure further provides a USB device, including:

a communication module configured to receive input information of a terminal through a HID device;

a debugging module configured to transmit the input information to a buffer of a virtual serial port TTY device when a report ID of the input information is a serial port ID;

extract the input information of the terminal from the buffer of the virtual serial port TTY device, execute a shell command on the input information, and return an execution result to the terminal through an original path.

Furthermore, the extracting the input information of the terminal from the buffer of the virtual serial port TTY device specifically includes extracting, by a GETTTY program, the input information of the terminal from the buffer of the virtual serial port TTY device by means of/dev/ttyHID0 of the virtual serial port TTY device.

Furthermore, the USB device also includes:

a HID device implementation module configured to implement a HID device on the USB device to be debugged, wherein the HID device contains two descriptors with different report IDs.

The embodiments of the present disclosure have the following beneficial effects:

the present disclosure provides a debugging method for a USB device and a USB device. In one embodiment, the debugging method includes: receiving input information of a terminal through a HID device; when a report ID of the input information is a serial port ID, transmitting the input information to a buffer of a virtual serial port TTY device; and extracting the input information of the terminal from the buffer of the virtual serial port TTY device, executing a shell command on the input information, and returning an execution result to the terminal through an original path. Based on this embodiment, a USB interface is used to implement a HID device, so as to realize execution without using a device driver. In addition, use of the endpoint of the HID device saves endpoints needed for additional debugging and driving.

DETAILED DESCRIPTION OF ILLUSTRATED EMBODIMENTS

In the following, the technical solutions in the embodiments of the present disclosure are clearly and completely described with reference to the drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without creative efforts are within the scope of the present disclosure.

It should be understood that when used in this description and the appended claims, the terms "including" and "comprising" indicate the presence of described features, entireties, steps, operations, elements and/or components; but do not exclude the presence or addition of one or more other features, entireties, steps, operations, elements, components and/or collections thereof.

It should also be understood that the term used in the description of the disclosure herein is for the purpose of describing particular embodiments only and is not intended to limit the disclosure. As used in the description and appended claims of the disclosure, the singular forms "a", "an" and "the" are intended to include the plural forms unless clearly indicates in the context otherwise.

It should be further understood that the term "and/or" used in the description and appended claims of the disclosure means any combination and all possible combinations of one or more of the items relatedly listed.

It should be noted that the step numbers used in the text are only for the convenience of description, and are not intended to limit the order of the execution of the steps.

Figure 1:
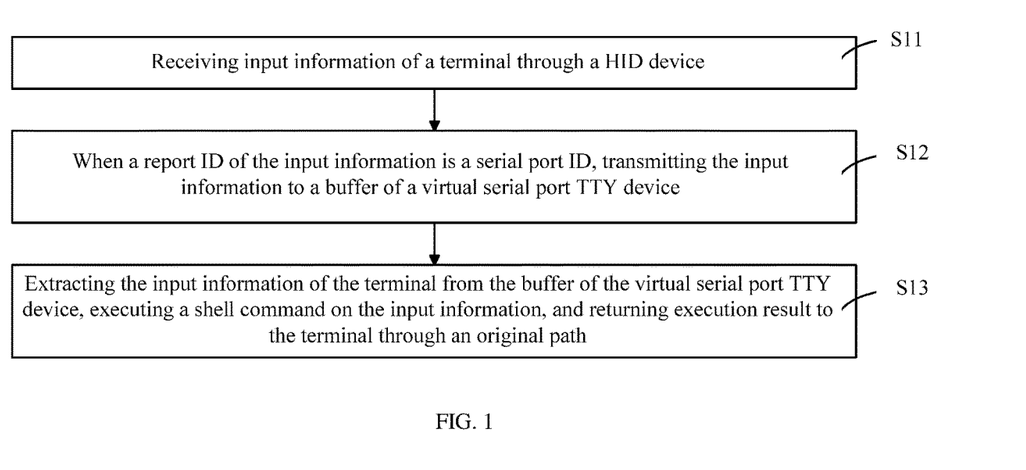
FIG. 1 is a schematic diagram 1 of a debugging method for a USB device according to an embodiment of the present disclosure.
Figure 2:
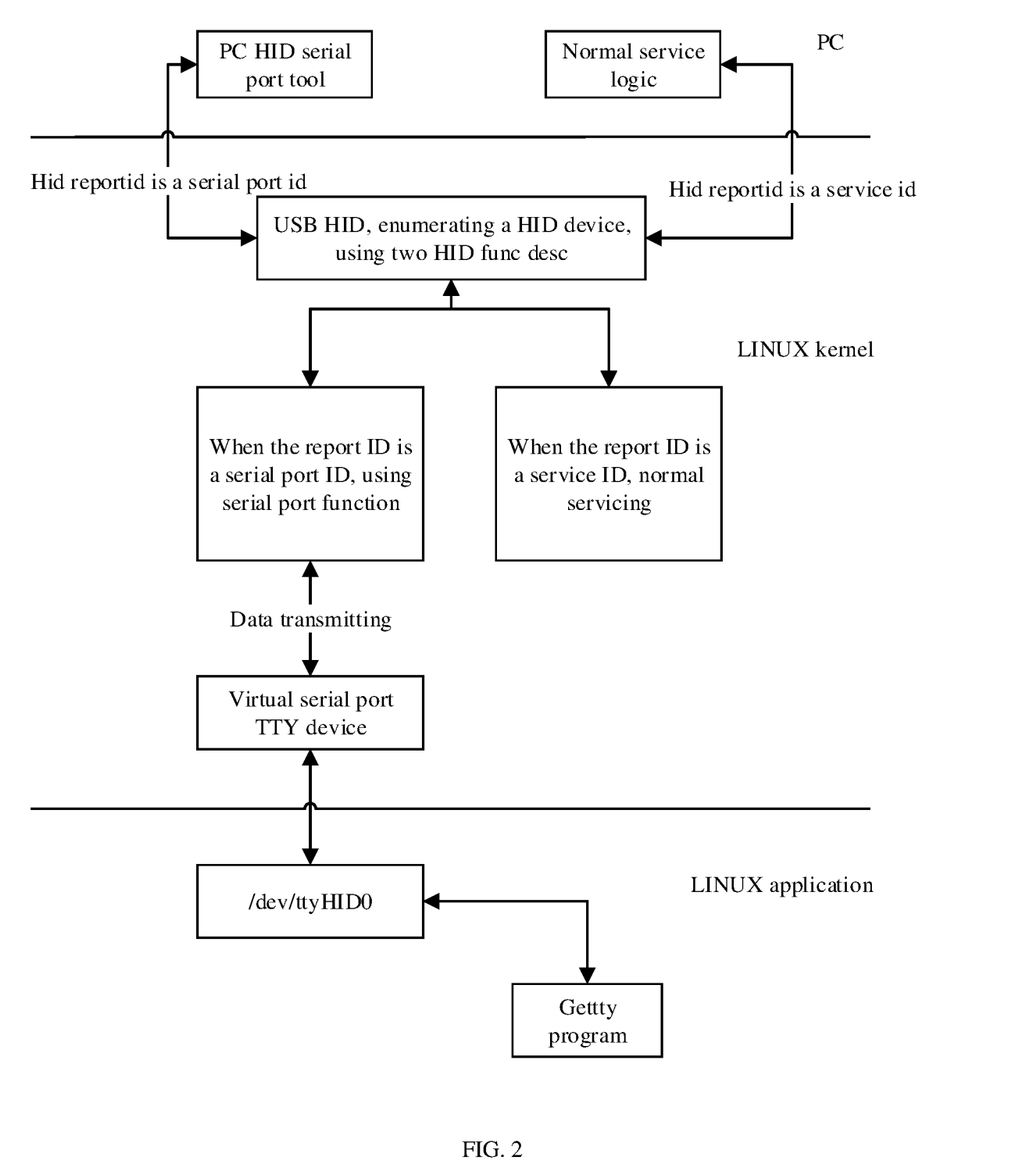
FIG. 2 is a schematic diagram 2 of a debugging method for a USB device according to an embodiment of the present disclosure.
Figure 3:
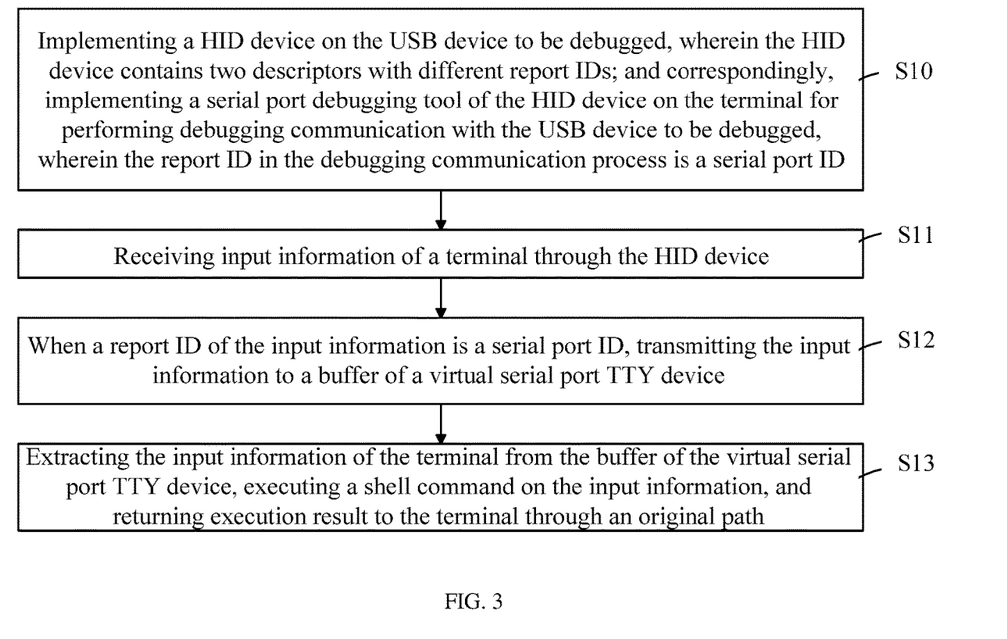
FIG. 3 is a schematic diagram 3 of a debugging method for a USB device according to an embodiment of the present disclosure.

Referring to FIGS. 1-3, the method includes the following steps:

S11, receiving input information of a terminal through a HID device.

The category of the HID device is the first USB category supported by WINDOWS.

Human Interface Device (HID) is a device that interacts directly with human, such as a keyboard, mouse and joystick. However, the devices that conforming to the HID category specification are all HID devices, and do not necessarily have a human interface.

Universal Serial Bus (USB) is a serial bus standard that connecting computer systems and external devices, and also a technical specification of input and output interfaces. It is widely used in information communication products such as personal computers and mobile devices, and extended to other related fields such as photographic equipment, digital TV, game consoles, etc.

Preferably, the terminal referred to in these embodiments should be a personal computer PC end. The terminal should be understood to include at least one of the followings: a smart phone, a tablet personal computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group (MPEG-1 or MPEG-2), an Audio Layer (MP3) Player, a Mobile Medical Device, a Camera or a Wearable Device (e.g., Headset Device (HMD) (such as electronic glass), electronic clothing, an electronic bracelet, an electronic necklace, an electronic application accessory, an electronic tattoo, a smart watch, etc.).

In a specific USB device debugging process, the input information of the terminal should be understood as debugging information. The debugging information may be instruction information for debugging the USB device to be debugged, instruction information for debugging the software, and the USB device to be debugged can response to the debugging information, process the specific content of the debugging information, and complete the instruction corresponding to the debugging information.

The instruction information for debugging the USB device to be debugged is used to complete the debugging of the USB device (chip) under the condition of instruction information of debugging the USB device. The instruction information for debugging the software is used to complete the debugging of the USB device (chip) software under the condition of instruction information of debugging the software in the USB device (chip). Preferably, when the debugging information is instruction information for debugging the software, in addition to performing software debugging, software upgrade should also be included.

S12, when report ID of the input information is a serial port ID, transmitting the input information to a buffer of a virtual serial port TTY device.

In a specific embodiment, a virtual serial port TTY device is implemented in the USB device to be debugged, and the node is/dev/ttyHID0. The virtual serial port TTY device is used to implement the LINUX console debugging serial port mechanism, and interact with the user input (through the terminal) through the GETTTY program.

S13, extracting the input information of the terminal from the buffer of the virtual serial port TTY device, executing a shell command on the input information, and returning an execution result to the terminal through an original path.

Wherein, the extracting the input information of the terminal from the buffer of the virtual serial port TTY device specifically includes extracting, by a GETTTY program, the input information of the terminal from the buffer of the virtual serial port TTY device by means of/dev/ttyHID0 of the virtual serial port TTY device.

The debugging of the USB device to be debugged depends on the SHELL support of LINUX itself. In this embodiment, the virtual serial port TTY device is used as the serial terminal of GETTTY. After log in, enter the SHELL, execute the shell command on the terminal, support the binary command execution of LINUX, and return the debugging results to the terminal.

Because the USB device to be debugged obtains debugging information by implementing the HID device, on the one hand, the driver-free is implemented directly without the need to install an additional driver, and on the other hand, the endpoint of the HID device is directly used, which saves the endpoints needed to implement additional debugging drivers.

It should be noted that only when the service of the USB device to be debugged is also implemented with the HID endpoint, the endpoint can be saved. For example, the function of the USB device to be debugged is a screen projector. If the USB device to be debugged uses other types of endpoints, such as a BULK endpoint, an isochronous endpoint, to implement the function of the USB device to be debugged, a HID device must be enumerated using the HID endpoint except for the function. It should be understood that when the report ID of the input information is a service ID, there is no need to implement a HID device.

Referring to FIGS. 2-3, in a preferred embodiment, the method further includes the following steps:

S10, Implementing a HID device on the USB device to be debugged, wherein the HID device contains two descriptors with different report IDs; and correspondingly, implementing a serial port debugging tool of the HID device on the terminal for performing debugging communication with the USB device to be debugged, wherein the report ID in the debugging communication process is the serial port ID.

The USB device to be debugged contains two FUNC descriptors. The report IDs of these two descriptors are different, wherein, one is a serial port ID and the other is a service ID. These two IDs can be customized as long as they are different.

In a preferred embodiment, the method further includes:
when the report ID of the input information is a service ID, performing normal service.

The normal service is actually related to the function of the USB device to be debugged. For example, when the function of the USB device to be debugged is a screen projector, the normal service refers to the transmission of the screen projection data and the control information.

When the terminal sends the display data and audio data that need to be screened to the USB device to be debugged through the service ID, at this time, the USB device to be debugged can judge that the report ID is the service ID, perform normal service processing, and transmit the display data and the audio data to other devices (such as monitors).

An embodiment of the present disclosure further provides a debugging method for a USB device, including:
sending input information to the USB device to be debugged, so that the USB device to be debugged performing the following steps:
receiving the input information of a terminal by a HID device.

The terminal referred to in this embodiment should preferably be a personal computer PC. The terminal should be understood to include at least one of the followings: a smart phone, a tablet personal computer (PC), a mobile phone, a video phone, an e-book reader, a desktop PC, a laptop PC, a netbook computer, an Personal Digital Assistant (PDA), a Portable Multimedia Player (PMP), a Moving Picture Experts Group (MPEG-1 or MPEG-2), an Audio Layer (MP3) Player, a Mobile Medical Device, a Camera or a Wearable Device (e.g., Headset Device (HMD) (such as electronic glass), electronic clothing, an electronic bracelet, an electronic necklace, an electronic application accessory, an electronic tattoo, a smart watch, etc.).

In a specific USB device debugging process, the input information of the terminal should be understood as debugging information. The debugging information may be instruction information for debugging the USB device to be debugged, instruction information for debugging the software, and the USB device to be debugged can response to the debugging information, process the specific content of the debugging information, and complete the instruction corresponding to the debugging information.

The instruction information for debugging the USB device to be debugged is used to complete the debugging of the USB device (chip) under the condition of instruction information of debugging the USB device. The instruction information for debugging the software is used to complete the debugging of the USB device (chip) software under the condition of instruction information of debugging the software in the USB device (chip). Preferably, when the debugging information is instruction information for debugging the software, in addition to performing software debugging, software upgrade should also be included.

When the report ID of the input information is a serial port ID, transmitting the input information to a buffer of a virtual serial port TTY device.

In a specific embodiment, a virtual serial port TTY device is implemented in the USB device to be debugged, and the node is/dev/ttyHID0. The virtual serial port TTY device is used to implement the LINUX console debugging serial port mechanism, and interact with the user input (through the terminal) through the GETTTY program.

Extracting the input information of the terminal from the buffer of the virtual serial port TTY device, executing a shell command on the input information, and returning an execution result to the terminal through the original path.

Wherein, the extracting the input information of the terminal from the buffer of the virtual serial port TTY device specifically includes extracting, by a GETTTY program, the input information of the terminal from the buffer of the virtual serial port TTY device by means of/dev/ttyHID0 of the virtual serial port TTY device.

The debugging of the USB device to be debugged depends on the SHELL support of LINUX itself. In this embodiment, the virtual serial port TTY device is used as the serial terminal of GETTTY. After log in, enter the SHELL, execute the shell command on the terminal, support the binary command execution of LINUX, and return the debugging results to the terminal.

Because the USB device to be debugged obtains debugging information by implementing the HID device, on the one hand, the driver-free is implemented directly without the need to install an additional driver, and on the other hand, the endpoint of the HID device is directly used, which saves the endpoints needed to implement additional debugging drivers.

It should be noted that only when the service of the USB device to be debugged is also implemented with the HID endpoint, the endpoint can be saved. For example, the function of the USB device to be debugged is a screen projector. If the USB device to be debugged uses other types of endpoints, such as a BULK endpoint, an isochronous endpoint, to implement the function of the USB device to be debugged, a HID device must be enumerated using the HID endpoint except for the function. It should be understood that when the report ID of the input information is a service ID, there is no need to implement a HID device.

In a preferred embodiment, the method further includes:
implementing a HID device on the USB device to be debugged, wherein the HID device contains two descriptors with different report IDs.

The USB device to be debugged contains two FUNC descriptors. The report IDs of these two descriptors are different, wherein, one is a serial port ID and the other is a service ID. These two IDs can be customized as long as they are different.

Correspondingly, implementing a serial port debugging tool of the HID device on the terminal for performing debugging communication with the USB device to be debugged, and the report ID in the debugging communication process being a serial port ID.

In a preferred embodiment, the method further includes:
when the report ID of the input information is a service ID, performing normal service.

The normal service is actually related to the function of the USB device to be debugged. For example, when the function of the USB device to be debugged is a screen projector, the normal service refers to the transmission of the screen projection data and the control information.

When the terminal sends the display data and audio data that need to be screened to the USB device to be debugged through the service ID, at this time, the USB device to be debugged can judge that the report ID is the service ID, perform normal service processing, and transmit the display data and the audio data to other devices (such as monitors).

Figure 4:
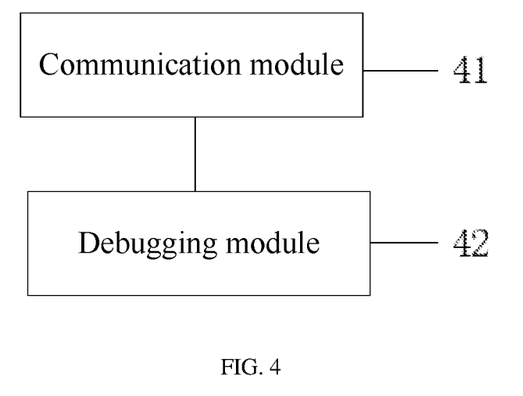
FIG. 4 is a schematic structural diagram 1 of a USB device according to an embodiment of the present disclosure.

Referring to FIG. 4, an embodiment of the present disclosure further provides a USB device, including:
a communication module 41 configured to receive input information of a terminal through a HID device.

Preferably, the terminal referred to in this embodiment should be a personal computer PC end. The terminal should be understood to include at least one of the followings: a smart phone, a tablet personal computer (PC), a mobile phone, a video phone, an e-book reader, a desktop PC, a laptop PC, a netbook computer, a personal Digital Assistant (PDA), a Portable Multimedia Player (PMP), a Moving Picture Experts Group (MPEG-1 or MPEG-2), an Audio Layer (MP3) Player, a Mobile Medical Device, a Camera or a Wearable Device (e g, Head-mounted Device (HMD) (such as electronic glass), electronic clothing, an electronic bracelet, an electronic necklace, an electronic application accessory, an electronic tattoo, a smart watch, etc.).

In a specific USB device debugging process, the input information of the terminal should be understood as debugging information. The debugging information may be instruction information for debugging the USB device to be debugged, instruction information for debugging the software, and the USB device to be debugged can response to the debugging information, process the specific content of the debugging information, and complete the instruction corresponding to the debugging information.

The instruction information for debugging the USB device to be debugged is used to complete the debugging of the USB device (chip) under the condition of instruction information of debugging the USB device. The instruction information for debugging the software is used to complete the debugging of the USB device (chip) software under the condition of instruction information of debugging the software in the USB device (chip). Preferably, when the debugging information is instruction information for debugging the software, in addition to performing software debugging, software upgrade should also be included.

A debugging module 42 configured to transmit the input information to a buffer of a virtual serial port TTY device when the report ID of the input information is a serial port ID; extracting the input information of the terminal from the buffer of the virtual serial port TTY device, executing a shell command on the input information, and returning the execution result to the terminal through the original path.

In a specific embodiment, a virtual serial port TTY device is implemented in the USB device to be debugged, and the node is/dev/ttyHID0. The virtual serial port TTY device is used to implement the LINUX console debugging serial port mechanism, and interacts with the user input (through the terminal) through the GETTTY program.

The extracting the input information of the terminal from the buffer of the virtual serial port TTY device specifically includes extracting, by a GETTTY program, the input information of the terminal from the buffer of the virtual serial port TTY device by means of/dev/ttyHID0 of the virtual serial port TTY device.

The debugging of the USB device to be debugged depends on the SHELL support of LINUX itself. In this embodiment, the virtual serial port TTY device is used as a serial terminal of GETTTY. After log in, enter the SHELL, execute the shell command on the terminal, support the binary command execution of LINUX, and return the debugging results to the terminal.

Because the USB device to be debugged obtains debugging information by implementing the HID device, on the one hand, the driver-free is implemented directly without the need to install an additional driver, and on the other hand, the endpoint of the HID device is directly used, which saves the endpoints needed to implement additional debugging drivers.

It should be noted that only when the service of the USB device to be debugged is also implemented with the HID endpoint, the endpoint can be saved. For example, the function of the USB device to be debugged is a screen projector. If the USB device to be debugged uses other types of endpoints, such as a BULK endpoint, an isochronous endpoint, to implement the function of the USB device to be debugged, a HID device must be enumerated using the HID endpoint except for the function. It should be understood that when the report ID of the input information is a service ID, there is no need to implement a HID device.

Figure 5:
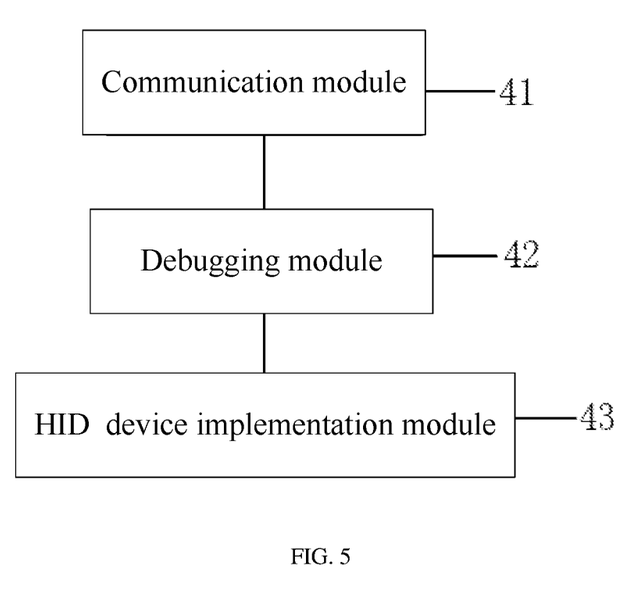
FIG. 5 is a schematic structural diagram 2 of a USB device according to an embodiment of the present disclosure.

Referring to FIG. 5, in a preferred embodiment, the USB device further includes:

a HID device implementation module 43 configured to implement a HID device on the USB device to be debugged, wherein the HID device contains two descriptors with different report IDs.

The USB device to be debugged contains two FUNC descriptors. The report IDs of these two descriptors are different, wherein, one is a serial port ID and the other is a service ID. These two IDs can be customized as long as they are different.

Correspondingly, implementing a serial port debugging tool of the HID device on the terminal for performing debugging communication with the USB device to be debugged, and the report ID in the debugging communication process being a serial port ID.

In a preferred embodiment, the communication module is further used to perform normal service when the report ID of the input information is a service ID.

The normal service is actually related to the function of the USB device to be debugged. For example, when the function of the USB device to be debugged is a screen projector, the normal service refers to the transmission of the screen projection data and the control information.

When the terminal sends the display data and audio data that need to be screened to the USB device to be debugged through the service ID, at this time, the USB device to be debugged can judge that the report ID is the service ID, perform normal service processing, and transmit the display data and the audio data to other devices (such as monitors).

A person of ordinary skill in the art can understand that all or part of the processes in the methods of the foregoing embodiments can be implemented by using a computer program to instruct related hardware. The program can be stored in a computer-readable storage medium. When the program is executed, the processes of the embodiments of the methods described above may be included. The storage medium may be a magnetic disk, an optical disk, a read-only memory (ROM) or a random access memory (RAM) etc.

The above is preferred embodiments of the present disclosure, and it should be noted that those skilled in the art can also make several improvements and retouches without departing from the principles of the present disclosure. These improvements and retouches are also in the protection scope of the present disclosure.

What is claimed is:

1. A debugging method for a Universal Serial Bus (USB) device, wherein the method comprises:
   receiving input information of a terminal through a Human Interface Device (HID) device;
   when a report ID of the input information is a serial port ID, transmitting the input information to a buffer of a virtual serial port Teletype (TTY) device; and
   extracting the input information of the terminal from the buffer of the virtual serial port TTY device, executing a shell command on the input information, and returning an execution result to the terminal through an original path.

2. The debugging method for the USB device according to claim 1, wherein the extracting the input information of the terminal from the buffer of the virtual serial port TTY device specifically comprises extracting, by a GETTTY program, the input information of the terminal from the buffer of the virtual serial port TTY device by means of /dev/ttyHID0 of the virtual serial port TTY device.

3. The debugging method for the USB device according to claim 1, wherein the method further comprises:
   implementing the HID device on the USB device to be debugged, wherein the HID device contains two descriptors with different report IDs; and
   correspondingly, implementing a serial port debugging tool for the HID device on the terminal to perform debugging communication with the USB device to be debugged, wherein the report ID in a debugging communication process is the serial port ID.

4. The debugging method for the USB device according to claim 1, wherein the method further comprises:
   when the report ID of the input information is a service ID, performing normal service.

5. A debugging method for a Universal Serial Bus (USB) device, wherein the method comprises:
   sending input information to a USB device to be debugged, so that the USB device to be debugged performs the following steps:
   receiving input information of a terminal through a Human Interface Device (HID) device;
   when a report ID of the input information is a serial port ID, transmitting the input information to a buffer of a virtual serial port Teletype (TTY) device; and
   extracting the input information of the terminal from the buffer of the virtual serial port TTY device, executing a shell command on the input information, and returning execution result to the terminal through an original path.

6. The debugging method for the USB device according to claim 5, wherein the extracting the input information of the terminal from the buffer of the virtual serial port TTY device specifically comprises extracting, by a GETTTY program, the input information of the terminal from the buffer of the virtual serial port TTY device by means of /dev/ttyHID0 of the virtual serial port TTY device.

7. The debugging method for the USB device according to claim 5, wherein the method further comprises:
   implementing the HID device on the USB device to be debugged, wherein the HID device contains two descriptors with different report IDs; and
   correspondingly, implementing a serial port debugging tool for the HID device on the terminal to perform debugging communication with the USB device to be debugged, wherein the report ID in a debugging communication process is the serial port ID.

8. A Universal Serial Bus (USB) device, wherein the USB device comprises:
   a communication module configured to receive input information from a terminal through a Human Interface Device (HID) device; and
   a debugging module configured to transmit the input information to a buffer of a virtual serial port Teletype (TTY) device when a report ID of the input information is a serial port ID; and extract the input information of the terminal from the buffer of the virtual serial port TTY device, execute a shell command on the input information, and return execution result to the terminal through an original path.

9. The USB device according to claim 8, wherein the extracting the input information of the terminal from the buffer of the virtual serial port TTY device specifically comprises extracting, by a GETTTY program, the input information of the terminal from the buffer of the virtual serial port TTY device by means of /dev/ttyHID0 of the virtual serial port TTY device.

10. The USB device of claim 8, wherein the USB device further comprises:
a HID device implementation module configured to implement the HID device on the USB device to be debugged, wherein the HID device contains two descriptors with different report IDs.

* * * * *